US008930481B2

(12) United States Patent
Zhang et al.

(10) Patent No.: US 8,930,481 B2
(45) Date of Patent: Jan. 6, 2015

(54) MESSAGE PROCESSING METHOD, TERMINAL AND SYSTEM

(71) Applicant: Huawei Technologies Co., Ltd., Shenzhen (CN)

(72) Inventors: Yibo Zhang, Beijing (CN); Baofeng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/145,262

(22) Filed: Dec. 31, 2013

(65) Prior Publication Data

US 2014/0189027 A1 Jul. 3, 2014

Related U.S. Application Data

(63) Continuation of application No. PCT/CN2013/080875, filed on Aug. 6, 2013.

(30) Foreign Application Priority Data

Dec. 31, 2012 (CN) .......................... 2012 1 0590094

(51) Int. Cl.
G06F 15/16 (2006.01)
H04L 12/58 (2006.01)

(52) U.S. Cl.
CPC ................... *H04L 51/046* (2013.01)
USPC ............ 709/206; 709/217; 709/229; 709/230

(58) Field of Classification Search
USPC ....................................................... 709/206
See application file for complete search history.

(56) References Cited

U.S. PATENT DOCUMENTS 6,408,330 B1 * 6/2002 DeLaHuerga ................. 709/217
6,704,789 B1 * 3/2004 Ala-Laurila et al. .......... 709/230

(Continued)

FOREIGN PATENT DOCUMENTS

| CN | 1750684 A | 3/2006 |
|---|---|---|
| CN | 101202792 A | 6/2008 |
| CN | 101262516 A | 9/2008 |
| CN | 101500206 A | 8/2009 |
| CN | 101500207 A | 8/2009 |
| CN | 101964847 A | 2/2011 |
| CN | 102289431 A | 12/2011 |

OTHER PUBLICATIONS

Foreign Communication From a Counterpart Application, PCT Application No. PCT/CN2013/080875, Chinese Search Report dated Oct. 31, 2013, 7 pages.

(Continued)

*Primary Examiner* — Hua Fan
(74) *Attorney, Agent, or Firm* — Conley Rose, P.C.; Grant Rodolph

(57) ABSTRACT

A message processing method, terminal and system. The method includes: obtaining a user's historical message interaction information and first context data associated with the user's historical message interaction information, where the user's historical message interaction information includes historical message interaction content and historical message replying status; determining the user's message interaction preferences according to the user's historical message interaction information and the first context data, where the message interaction preferences include a message reply policy and/or a message writing style; receiving a current message sent to the user, and obtaining second context data associated with the current message; and replying to the current message according to the message interaction preferences, the current message, and the second context data. With the present invention, the user's message interaction preferences are determined, and the current message can be replied automatically, thereby enhancing user experience.

15 Claims, 9 Drawing Sheets

(56) References Cited

U.S. PATENT DOCUMENTS

| | | | |
|---|---|---|---|
| 6,779,024 B2 * | 8/2004 | DeLaHuerga | 709/217 |
| 8,200,692 B2 * | 6/2012 | Xu et al. | 707/769 |
| 2002/0116509 A1 * | 8/2002 | DeLaHuerga | 709/229 |
| 2002/0187794 A1 | 12/2002 | Fostick et al. | |
| 2003/0187984 A1 | 10/2003 | Banavar et al. | |
| 2006/0146997 A1 | 7/2006 | Qian et al. | |
| 2007/0201634 A1 | 8/2007 | Bonnaud et al. | |
| 2008/0126112 A1 | 5/2008 | Xu | |
| 2009/0077185 A1 | 3/2009 | Chiu et al. | |
| 2010/0323730 A1 | 12/2010 | Karmarkar | |
| 2011/0029647 A1 | 2/2011 | Ginevan et al. | |
| 2011/0151852 A1 | 6/2011 | Olincy et al. | |
| 2012/0083287 A1 | 4/2012 | Casto et al. | |

OTHER PUBLICATIONS

Foreign Communication From a Counterpart Application, PCT Application No. PCT/CN2013/080875, Chinese Written Opinion dated Oct. 31, 2013, 4 pages.

Foreign Communication From A Counterpart Application, European Application No. 13801459.2, Extended European Search Report dated Nov. 10, 2014, 7 pages.

* cited by examiner

MESSAGE PROCESSING METHOD, TERMINAL AND SYSTEM

CROSS-REFERENCE TO RELATED APPLICATIONS

This application is a continuation of International Application No. PCT/CN2013/080875, filed on Aug. 6, 2013, which claims priority to Chinese Patent Application No. 201210590094.3 filed on Dec. 31, 2012, both of which are hereby incorporated by reference in their entireties.

TECHNICAL FIELD

The present invention relates to the communications field, and in particular, to a message processing method, terminal and system in the communications field.

BACKGROUND

According to statistics made by the International Telecommunications Union (ITU), a total of 6.1 tera (T) short messages were sent across the world in 2010, that is, each mobile phone user in the world sent 1300 short messages. The short message service has now become the world's largest telecom value-added application industry, and the revenues of the short message service (SMS) in 2010 reach US$114.6 billion. Judging from the trend in the next five years, the short message service is still the most influential information service. As conservatively estimated by the ITU, the global short message service revenue in 2013 will reach US$177 billion.

As regards a terminal manufacturer, how to bring a better experience for a user is one of the important strategies that make the terminal manufacturer stand out. In addition, with the short message service being the most commonly used service on a mobile phone terminal, helping a user use the short message service conveniently is an easy way of enhancing the experience of the user of a terminal.

Currently, the biggest problem for a user to use the short message service is slow and tedious input. Especially, in the case of replying to an SMS message, the problem is more prominent. For example, at a meeting, an urgent SMS message is received and needs a reply, but using a mobile phone for a long time at the meeting is impolite, which results in a poor user experience. How to help a user use the short message service conveniently, for example, to reply to an SMS message, is an urgent problem to solve.

An input technology based on voice recognition can effectively help improve the input speed in a mobile phone application. Well-known Chinese voice recognition input systems include IFLYTEK, Chinese Academy of Sciences Tianyu, and so on. Using the voice recognition technology to reply to an SMS message can enhance the user experience. However, in an open area (without limiting the vocabulary scope and the speaker) noisy environment, the voice recognition technology is not practical due to inaccuracy, and is not applicable when speaking is inappropriate and inputting is urgent, for example, in an application scenario in which an SMS message needs a reply at a meeting. Therefore, user experience still needs to be further enhanced in the solution that uses the voice recognition technology to reply to an SMS message.

In a solution that replies to an SMS message based on a fixed rule, a received SMS message can be classified according to established classification conditions, and then the SMS message is replied to according to content preset by a user. The specific technical solution may be implemented by a terminal or a network device, or implemented by a combination of the terminal and the network device. For example, the user may preset reply content "Sorry, the SMS message is not replied in time because the mobile phone is powered off" for an SMS message received when the mobile phone is powered off, and the content will be sent automatically in response to the SMS message received when the mobile phone is powered off.

This SMS message replying solution can partly meet requirements. However, the manually set rules are limited, the reply content is fixed, and the effect is not satisfying in most circumstances. In certain circumstances, such automatic replying may lead to misunderstanding and make the user feel disgusted. For example, when B is outside the service area and receives a help-seeking SMS message from A, if preset content "I cannot see the SMS message currently, please contact me later" is returned, after receiving the reply, A will believe that B is making excuses deliberately, and the automatic replying function is counterproductive. Therefore, in such an SMS message replying solution, the user experience still needs to be enhanced.

SUMMARY

The present invention provides a message processing method, terminal, and system, which can enhance user experience.

According to a first aspect, a message processing method is provided, including: obtaining a user's historical message interaction information and first context data associated with the user's historical message interaction information, where the user's historical message interaction information includes historical message interaction content and historical message replying status, and the first context data is used to represent user information or environment information when the user's historical message interaction information occurs; determining the user's message interaction preferences according to the user's historical message interaction information and the first context data, where the message interaction preferences include a message reply policy and/or a message writing style; receiving a current message sent to the user, and obtaining second context data associated with the current message, where the second context data is used to represent user information or environment information when the user's current message occurs; and replying to the current message according to the message interaction preferences, the current message, and the second context data.

In a first possible implementation manner of the first aspect, the method further includes: performing preprocessing for the user's historical message interaction content; and the determining the user's message interaction preferences includes determining the user's message interaction preferences according to the user's preprocessed historical message interaction content and the first context data.

With reference to the first aspect or the first possible implementation manner of the first aspect, in a second possible implementation manner of the first aspect, the determining the user's message interaction preferences includes determining the message writing style that includes the user's emoticon preferences according to emoticons in the user's historical message interaction content and the first context data.

With reference to the first aspect or the first or second possible implementation manner of the first aspect, in a third possible implementation manner of the first aspect, the method further includes: obtaining, from a server or a user database, historical message interaction information of at least one other user than the user, and third context data associated with the at least one other user's historical message interaction information, where the third context data is used to represent the at least one other user's user information or environment information when the at least one other user's historical message interaction information occurs; and the determining the user's message interaction preferences includes: determining the user's message interaction preferences according to the user's historical message interaction information, the first context data, the at least one other user's historical message interaction information, and the third context data.

With reference to the first aspect or any one of the first to third possible implementation manners of the first aspect, in a fourth possible implementation manner of the first aspect, the determining the user's message interaction preferences includes: determining the user's message interaction preferences in a statistic-based learning manner.

With reference to the first aspect or any one of the first to fourth possible implementation manners of the first aspect, in a fifth possible implementation manner of the first aspect, the replying to the current message according to the message interaction preferences, the current message, and the second context data includes: according to the message interaction preferences, determining a mapping rule between the user's historical message interaction status, historical message reception content included in the user's historical message interaction content, and the first context data; according to the mapping rule, using the current message and the second context data as an input of the mapping rule, and determining a message reply policy of the current message; and replying to the current message according to the message reply policy of the current message.

With reference to the fifth possible implementation manner of the first aspect, in a sixth possible implementation manner of the first aspect, the replying to the current message according to the message reply policy of the current message includes: when the message reply policy of the current message indicates replying to the current message, generating a reply content and replying to the current message according to the message reply policy of the current message, or according to the message reply policy and by using the message writing style included in the message interaction preferences; or, when the message reply policy of the current message indicates no replying to the current message, ignoring the current message.

With reference to the sixth possible implementation manner of the first aspect, in a seventh possible implementation manner of the first aspect, the generating reply content and replying to the current message includes: generating at least one piece of reply content of the current message; displaying the at least one piece of reply content to the user, and determining reply content selected by the user from the at least one piece of reply content; and sending the reply content selected by the user to a sender of the current message.

With reference to the first aspect or any one of the first to seventh possible implementation manners of the first aspect, in an eighth possible implementation manner of the first aspect, the user information or environment information includes at least one of the following information the user's schedule, the user's location information, the user's moving manner information, and the user's surroundings information.

With reference to the first aspect or any one of the first to seventh possible implementation manners of the first aspect, in a ninth possible implementation manner of the first aspect, the message reply policy includes at least one of the following information: whether to reply to the message, a manner of replying to the message, time of replying to the message, and environment conditions of replying to the message.

With reference to the first aspect or any one of the first to seventh possible implementation manners of the first aspect, in a tenth possible implementation manner of the first aspect, the message writing style includes at least one of the following information: replying manner, replying tone, and frequently used words and sentence patterns.

With reference to the first aspect or any one of the first to seventh possible implementation manners of the first aspect, in an eleventh possible implementation manner of the first aspect, the message includes an SMS message, an instant message, a direct message of microblog, or a WeChat message.

According to a second aspect, a message processing terminal is provided, including: a first obtaining module configured to obtain a user's historical message interaction information and first context data associated with the user's historical message interaction information, where the user's historical message interaction information includes historical message interaction content and historical message replying status, and the first context data is used to represent user information or environment information when the user's historical message interaction information occurs; a determining module configured to determine the user's message interaction preferences according to the user's historical message interaction information and the first context data that are obtained by the first obtaining module, where the message interaction preferences include a message reply policy and/or a message writing style; a second obtaining module configured to receive a current message sent to the user, and obtain second context data associated with the current message, where the second context data is used to represent user information or environment information when the user's current message occurs; and a replying module configured to reply to the current message according to the message interaction preferences determined by the determining module and the current message and the second context data that are obtained by the second obtaining module.

In a first possible implementation manner of the second aspect, the terminal further includes a preprocessing module configured to perform preprocessing for the user's historical message interaction content, where the determining module is configured to determine the user's message interaction preferences according to the user's historical message interaction content preprocessed by the preprocessing module and the first context data.

With reference to the second aspect or the first possible implementation manner of the second aspect, in a second possible implementation manner of the second aspect, the determining module is further configured to determine the message writing style that includes the user's emoticon preferences according to emoticons in the user's historical message interaction content and the first context data.

With reference to the second aspect or the first or second possible implementation manner of the second aspect, in a third possible implementation manner of the second aspect, the determining module is configured to determine the user's message interaction preferences in a statistic-based learning manner.

With reference to the second aspect or any one of the first to third possible implementation manners of the second aspect, in a fourth possible implementation manner of the second aspect, the replying module includes: a first determining unit configured to determine according to the message interaction preferences, a mapping rule between the user's historical message interaction status, historical message reception content included in the user's historical message interaction content, and the first context data; a second determining unit configured to use, according to the mapping rule determined by the first determining unit, the current message and the second context data as an input of the mapping rule, and determine a message reply policy of the current message; and a replying unit configured to reply to the current message according to the message reply policy of the current message, where the policy is determined by the second determining unit.

With reference to the fourth possible implementation manner of the second aspect, in a fifth possible implementation manner of the second aspect, the replying unit is configured to: generate, when the message reply policy of the current message indicates replying to the current message, reply content and reply to the current message according to the message reply policy of the current message, or according to the message reply policy and by using the message writing style included in the message interaction preferences; or ignore, when the message reply policy of the current message indicates no replying to the current message, the current message.

With reference to the fourth possible implementation manner of the second aspect, in a sixth possible implementation manner of the second aspect, the replying unit includes: a generating subunit configured to generate at least one piece of reply content of the current message according to the message reply policy of the current message, where the policy is determined by the second determining unit; a controlling subunit configured to display the at least one piece of reply content generated by the generating subunit to the user, and determine reply content selected by the user from the at least one piece of reply content; and a second sending subunit configured to send the reply content selected by the user and determined by the controlling subunit to a sender of the current message.

With reference to the second aspect or any one of the first to sixth possible implementation manners of the second aspect, in a seventh possible implementation manner of the second aspect, the user information or environment information includes at least one of the following information: the user's schedule, the user's location information, the user's moving manner information, and the user's surroundings information.

With reference to the second aspect or any one of the first to sixth possible implementation manners of the second aspect, in an eighth possible implementation manner of the second aspect, the message reply policy includes at least one of the following information: whether to reply to the message, a manner of replying to the message, time of replying to the message, and environment conditions of replying to the message.

With reference to the second aspect or any one of the first to sixth possible implementation manners of the second aspect, in a ninth possible implementation manner of the second aspect, the message writing style includes at least one of the following information: replying manner, replying tone, and frequently used words and sentence patterns.

With reference to the second aspect or any one of the first to sixth possible implementation manners of the second aspect, in an tenth possible implementation manner of the second aspect, the message includes an SMS message, an instant message, a direct message of microblog, or a WeChat message.

According to a third aspect, a message processing system is provided and the system includes a terminal and a server, where the terminal includes: a data collecting module configured to obtain a user's historical message interaction information and first context data associated with the user's historical message interaction information, where the first context data is used to represent user information or environment information when the user's historical message interaction information occurs; and a data integrator configured to integrate the user's historical message interaction information and the first context data that are obtained by the data collecting module to obtain a data format suitable for learning and inputting, and send the integrated data in the data format to the server. The server includes: a learning module configured to receive the data in the data format from the data integrator, and perform statistic-based learning for the user's message interaction preferences according to the data, where the message interaction preferences include a reply policy and/or a message writing style; a user model generator configured to configure a reply policy model and a content generation model for the terminal according to a result of the statistic-based learning performed by the learning module, where the data collecting module is further configured to receive a current message sent to the user, and obtain second context data associated with the current message, where the second context data is used to represent user information or environment information when the user's current message occurs. The terminal further includes a replying module configured to reply to the current message according to the reply policy model and the content generation model that are configured by the user model generator and the current message and the second context data that are obtained by the data collecting module.

In a first possible implementation manner of the third aspect, the data integrator is configured to preprocess historical message interaction content included in the user's historical message interaction information obtained by the data collecting module, integrate the user's preprocessed historical message interaction content to obtain a data format suitable for learning and inputting, and send the integrated data in the data format to the server.

With reference to the third aspect or the first possible implementation manner of the third aspect, in a second possible implementation manner of the third aspect, the learning module is further configured to perform statistic-based learning for emoticon preferences in the user message interaction according to emoticons in the historical message interaction content included in the user's historical message interaction information and the first context data, so as to determine the message writing style that includes the user's emoticon preferences.

With reference to the third aspect or the first or second possible implementation manner of the third aspect, in a third possible implementation manner of the third aspect, the server further includes: a data obtaining module configured to obtain, from a server or a user database, historical message interaction information of at least one other user than the user, and third context data associated with the at least one other user's historical message interaction information, where the third context data is used to represent the at least one other user's user information or environment information when the at least one other user's historical message interaction information occurs, where the learning module is further configured to perform statistic-based learning for the user's message interaction preferences according to the data in the data format that is sent by the data integrator, and according to the at least one other user's historical message interaction information and the third context data that are obtained by the data obtaining module.

With reference to the third aspect or any one of the first to third possible implementation manners of the third aspect, in a fourth possible implementation manner of the third aspect, the replying module includes a reply adjudicating unit configured to use according to the reply policy model, the current message and the second context data as an input of the reply policy model, and determine a reply policy of the current message.

With reference to the fourth possible implementation manner of the third aspect, in a fifth possible implementation manner of the third aspect, the replying module further includes a reply content generating unit configured to generate when the reply adjudicating unit determines that the reply policy of the current message is replying to the current message, reply content and reply to the current message according to the reply policy of the current message and the content generation model.

With reference to the fifth possible implementation manner of the third aspect, in a sixth possible implementation manner of the third aspect, the reply content generating unit includes: a generating subunit configured to generate at least one piece of reply content of the current message according to the content generation model, the current message, and the second context data; a controlling subunit configured to display the at least one piece of reply content generated by the generating subunit to the user, and determine reply content selected by the user from the at least one piece of reply content; and a sending subunit configured to send the reply content selected by the user and determined by the controlling subunit to a sender of the current message.

With reference to any one of the third to sixth possible implementation manners of the third aspect, in a seventh possible implementation manner of the third aspect, the user information or environment information includes at least one of the following information: the user's schedule, the user's location information, the user's moving manner information, and the user's surroundings information.

With reference to the third aspect or any one of the first to sixth possible implementation manners of the third aspect, in an eighth possible implementation manner of the third aspect, the message interaction preferences include a message reply policy, and the message reply policy includes at least one of the following information: whether to reply to the message, a manner of replying to the message, time of replying to the message, and environment conditions of replying to the message.

With reference to the third aspect or any one of the first to sixth possible implementation manners of the third aspect, in a ninth possible implementation manner of the third aspect, the message interaction preferences include a message writing style, and the message writing style includes at least one of the following information: replying manner, replying tone, and frequently used words and sentence patterns.

With reference to the third aspect or any one of the first to sixth possible implementation manners of the third aspect, in a tenth possible implementation manner of the third aspect, the message includes an SMS message, an instant message, a direct message of microblog, or a WeChat message.

Based on the foregoing technical solution, in the message processing method, terminal and system in the present invention, the user's message interaction preferences are determined according to the historical message interaction information and the context data associated with the user's historical message interaction information, and the current message can be replied automatically according to the message interaction preferences, and therefore, the message reply caters for the user's personality and preferences and adapts to the message reception context, and the user experience is enhanced significantly.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly a describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention are applicable to various communications systems, for example, Global System of Mobile Communications (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunications System (UMTS), Worldwide Interoperability for Microwave Access (WiMAX) communications system, and so on.

It should also be understood that, a terminal in the embodiments of the present invention is also referred to as a user equipment (UE), a mobile station (MS), or a mobile terminal, or the like; and the terminal may communicate with one or more core networks through a radio access network (RAN). For example, the terminal may be a mobile phone (or referred to as a "cellular" phone), or the terminal may be a portable, pocket, handheld, computer-embedded, or vehicle-mounted mobile apparatus. They exchange voice and/or data with the radio access network.

Figure 1:
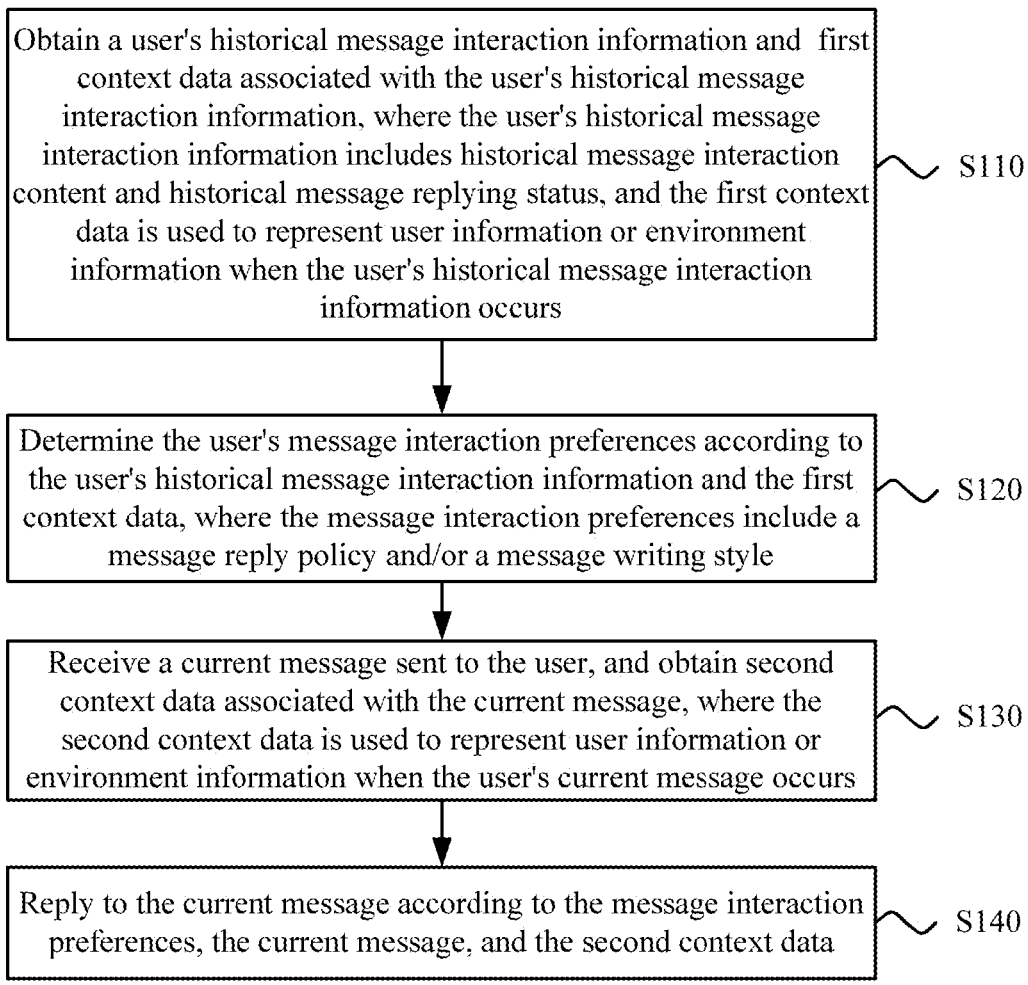
FIG. 1 is a schematic flowchart of a message processing method according to an embodiment of the present invention.

FIG. 1 is a schematic flowchart of a message processing method 100 according to an embodiment of the present invention. For example, the method 100 is performed by a message processing apparatus. As shown in FIG. 1, the method 100 includes the following steps:

S110. Obtain a user's historical message interaction information and first context data associated with the user's historical message interaction information, where the user's historical message interaction information includes historical message interaction content and historical message replying status, and the first context data is used to represent user information or environment information when the user's historical message interaction information occurs.

S120. Determine the user's message interaction preferences according to the user's historical message interaction information and the first context data, where the message interaction preferences include a message reply policy and/or a message writing style.

S130. Receive a current message sent to the user, and obtain second context data associated with the current message, where the second context data is used to represent user information or environment information when the user's current message occurs.

S140. Reply to the current message according to the message interaction preferences, the current message, and the second context data.

To facilitate the user to use message services and enhance experience of the user of a terminal, the message processing apparatus may obtain the user's historical message interaction information and the first context data associated with the user's historical message interaction information, and determine the user's message interaction preferences according to such information; therefore, when receiving the current message, the message processing apparatus may obtain the second context data associated with the current message, and reply to the current message according to the second context data and the determined user's message interaction preferences.

Therefore, in the message processing method in the embodiment of the present invention, the user's message interaction preferences are determined according to the historical message interaction information and the context data associated with the user's historical message interaction information, and the current message can be replied automatically according to the message interaction preferences, and therefore, the message reply caters for the user's personality and preferences and adapts to the message reception context, and the user experience is enhanced significantly.

Specifically, in the message processing method in the embodiment of the present invention, on one hand, the user habit of replying to a message and personal preferences such as a writing style of reply content are considered, so that the message processing apparatus can automatically reply to the received current message, which better embodies the user's personal style, and makes the reply more genuine and appropriate. On the other hand, the context data associated with the user's historical message interaction information is considered in the user's message interaction preferences determined by the message processing apparatus, so that when making an automatic reply to the received current message, the message processing apparatus is capable of giving a reply policy and/or reply content consistent with the current actual context in light of the context data associated with the current message. Therefore, the message processing method in the embodiment of the present invention can enhance the user experience significantly.

It should be understood that, an example in which the method 100 is performed by the message processing apparatus is used in the embodiment of the present invention, but the embodiment of the present invention is not limited to this example. For example, the method 100 may be performed by a terminal, may also be performed by a server, or may further be performed by a combination of a terminal and a server.

In S110, the message processing apparatus may obtain the user's historical message interaction information and the first context data associated with the user's historical message interaction information.

Specifically, in the embodiment of the present invention, optionally, the historical message interaction information includes historical message interaction content and historical message replying status; optionally, the historical message interaction content includes historical message reception content and historical message reply content; and, optionally, the historical message replying status includes at least one item of the following: whether to reply to a historical message, a manner of replying to a historical message, time of replying to a historical message, and environment conditions of replying to a historical message.

For example, the historical message replying status may include whether to reply to a historical message; when the historical message is replied, the historical message replying status may further include the manner of replying to the historical message, for example, SMS message reply or voice reply; or include information about the time of replying to the historical message, for example, replying within one minute, or replying within an hour; or also include the environment conditions of replying to the historical message, for example, replying in a conference application scenario, or location information when the historical message is replied. It should be understood that, the foregoing is only an example for describing the embodiment of the present invention, and the embodiment of the present invention is not limited to the example. For example, the historical message replying status may further include other reply recipients of the historical message.

In the embodiment of the present invention, the first context data is used to represent user information or environment information when the user's historical message interaction information occurs. Optionally, the user information or environment information includes at least one of the following information: the user's schedule, the user's location information, the user's moving manner information, and the user's surroundings information.

Specifically, the first context data refers to a sum of user information or environment information that can be obtained from a period before receiving the message to a period after receiving the message and affect message replying, where the context data is also referred to as a context associated with the message. It should be understood that, in the embodiment of the present invention, the context data associated with the message may refer to the first, second or third context data. It should also be understood that, the context environment here is not limited to the information that can be obtained by the terminal, and may also include information that can be obtained by a network device.

In the embodiment of the present invention, the context data associated with the message, that is, the user information or environment information, may include all kinds of environment information that affects message replying. For example, the user information or environment information may include a message sender. For example, if Zhang Wuji may refuse an appointment request from Ding Minjun but will not refuse a request from Zhao Min, the message sender affects message replying. The user information or environment information may include historical content of communication between the user and the message sender. For example, an urban management officer talks with a mayor in a way that is absolutely different from the way of talking with a street vendor. The user information or environment information may include the user's schedule. For example, a star has decided to conduct an overseas tour in the coming two weeks, and thus cannot promise to meet domestic fans for sure. The user information or environment information may include the user's location information. For example, an official in Beijing is unable to immediately participate in a schoolmate gathering in Shanghai. The user information or environment information may include moving manner information. For example, the user is in a traffic jam, and thus cannot attend a meeting in time as scheduled. The user information or environment information may include user surrounding environment information. The environment information may include noise level, and so on. For example, in a very noisy environment, "Very noisy now and I'll dial back soon in another place" is a polite reply to an incoming call. The environment information may also include surroundings. For example, the user is accustomed to having a one-hour walk from 3:00 p.m. to 4:00 p.m., so the reply may be set to be sent one hour later according to the user habit.

It should be understood that, the user information or environment information may further include other information, and the embodiment of the present invention is not limited to the examples given herein. It should also be understood that, in the embodiment of the present invention, the terms "first", "second", and "third" are merely intended to distinguish different information or content, and shall not be construed as limitations on specific names. For example, "the first context data" may refer to the context data associated with the user's historical message interaction information; "the second context data" may refer to the context data associated with the user's current message; and "the third context data" may refer to the context data associated with at least one other user's historical message interaction information, but the embodiment of the present invention is not limited to that.

In the embodiment of the present invention, it should be understood that, the message processing apparatus may obtain the user's historical message interaction information and the first context data associated with the user's historical message interaction information according to the historical message interaction records stored in the apparatus; and the message processing apparatus may obtain the user's historical message interaction information and the first context data associated with the user's historical message interaction information according to operation support system (OSS) data of a service provider. It should also be understood that, the message processing apparatus may use other methods to obtain the foregoing information or data, and the embodiment of the present invention is not limited to the examples given herein.

In the embodiment of the present invention, optionally, the message includes an SMS message, an instant message, a direct message of microblog, or a WeChat message. It should be understood that, the message may further include information in other forms, and the embodiment of the present invention is not limited to the examples given herein.

In S120, the message processing apparatus may determine the user's message interaction preferences according to the user's historical message interaction information and the first context data, where the message interaction preferences include a message reply policy and/or a message writing style.

In the embodiment of the present invention, optionally, the message reply policy includes at least one of the following information: whether to reply to the message, a manner of replying to the message, time of replying to the message, and environment conditions of replying to the message.

Specifically, the message reply policy may include whether to reply to the message, for example, not replying to the message, or replying to the message. If replying to the message is determined, the message reply policy may include a manner of replying to the message, for example, replying in an SMS message, or replying in a WeChat message, or the like. The message reply policy may include information about the time of replying to the message, for example, replying in a minute, or replying in an hour, or the like. The message reply policy may include environment conditions of replying to the message, for example, replying by means of an SMS message in a conference application scenario, or replying by means of voice in a private space, or the like. It should be understood that, the foregoing is only an example for describing the embodiment of the present invention, and the embodiment of the present invention is not limited to the example. For example, the message reply policy may further include other reply recipients of the historical message.

In the embodiment of the present invention, optionally, the message writing style includes at least one of the following information: replying manner, replying tone, and frequently used words and sentence patterns.

For example, the replying manner include SMS message manner, instant message manner, direct message of microblog, WeChat message manner, or voice manner; the replying tone may be a discussion tone, affirmative tone, a questioning tone, or the like; and the reply sentence patterns may be short sentence patterns, detailed and clear sentence patterns, or the like. The embodiment of the present invention is not limited to the examples given herein.

It should be understood that, in the message processing apparatus, the term "and/or" herein denotes only an association relationship between associated objects, and may represent three relationships. For example, A and/or B may represent the following three cases: only A exists, both A and B exist, and only B exists. In addition, the character "/" herein generally means that associated objects are in an "or" relationship.

In the embodiment of the present invention, optionally, the message processing apparatus determines the user's message interaction preferences in a statistic-based learning manner according to the user's historical message interaction information and the first context data.

For example, the message processing apparatus obtains historical message interaction records of interaction between user A and his father-in-law user B, and, through data statistics, learns and determines historical statistics of replies from user A to user B, which are roughly listed in Table 1:

TABLE 1

| Serial Number | Template number | Accept or not | Reply policy | Reply content | Probability |
|---|---|---|---|---|---|
| 1 | Template 1 | Accept | Reply immediately | "OK. I'll handle as supposed by you" | 50% |
| 2 | Template 2 | Accept | Reply immediately | "Please wait. I'll come as soon as I get out of what I'm doing now" | 20% |
| 3 | Template 3 | Reject | Reply immediately | "To save your trouble, I'll take care of it by myself" | 15% |
| 4 | Template 4 | Accept | Reply immediately | "OK. I'll pay attention. Don't worry" | 7% |
| 5 | Template 5 | Accept | Reply immediately | "No problem. I'll reply to you so soon as I receive it" | 4% |
| 6 | Template 6 | XX | XX | "..." | ... |

Therefore, it is determined that the reply policy of a reply from user A to user B is generally replying to the message, and the time of replying to the message is immediate reply, and so on; and it is determined that the writing style is a very polite and respectful replying tone, and a frequently used word is the honorific word "You", and so on. It should be understood that, the specific reply policy and message writing style of replies from user A to user B still need to be determined according to the current message received by user A from user B and the context data associated with the current message. The following further describes this example.

It should be understood that, in the embodiment of the present invention, the process of statistic-based learning may be a process of determining a parameter set in a mapping function according to actual data used as an input and according to a given mapping function form, and the message interaction preferences may be the form of the mapping function; and, in addition, the process of replying to the message according to the message interaction preferences may be a process of determining a value of the mapping function according to a new input.

It should be understood that, in the embodiment of the present invention, the statistic-based learning method is independent of natural language processing technologies of a specific language, such as word segmentation and semantic analysis. Therefore, the system application environments of the embodiment of the present invention are not limited to Chinese, and can be conveniently extended to automatic message replying in various languages.

In S130, the message processing apparatus receives the current message and may obtain second context data associated with the current message, which can be used for replying to the current message.

In the embodiment of the present invention, optionally, the second context data includes at least one of the following information: the user's schedule, the user's location information, the user's moving manner information, and the user's surroundings information.

In S140, the message processing apparatus can reply to the current message according to the message interaction preferences, the current message, and the second context data.

Still using the reply from user A to user B as an example, assuming that user A at a meeting receives from user B an SMS message "Do you have time now? Pick me up at 5:00 p.m.", according to the message interaction preferences of user A, it is analyzed that the probability of user A accepting user B's requests (such as 70/74-94.6%) is very high, and therefore, template 1 is applicable to replying to this message;

however, according to user A's schedule information included in the second context data, user A needs to attend a meeting from 4:30 p.m. to 5:30 p.m., and therefore, it is determined that the reply policy for the current message is to accept the request and reply to the message immediately, and the message may be replied by using statistic replying template 2.

The message processing apparatus can further learn the approximate location of the home of user B according to the second context data, and can figure out that it takes about half an hour to go from the company of user A to the home of user B, and therefore, an SMS message "Please wait. I'll come as soon as I get out of what I'm doing now, at about 6:00" may be created as a reply. The reply may be displayed on the screen for user A to confirm and send.

That is, the message processing method put forward in the present invention can learn the user's personal SMS message replying preferences and SMS message writing style from the user's SMS message reply records and related contexts, and thus decide the reply policy of the SMS message and generate the related reply content according to the personal characteristics and the SMS message reception context, and finally, submit the generated reply content to the user for approval, where the reply content is sent after being confirmed by the user.

Therefore, in the message processing method in the embodiment of the present invention, the user's message interaction preferences are determined according to the historical message interaction information and the context data associated with the user's historical message interaction information, and the current message can be replied automatically according to the message interaction preferences, and therefore, the message reply caters for the user's personality and preferences and adapts to the message reception context, and the user experience is enhanced significantly.

Figure 2:
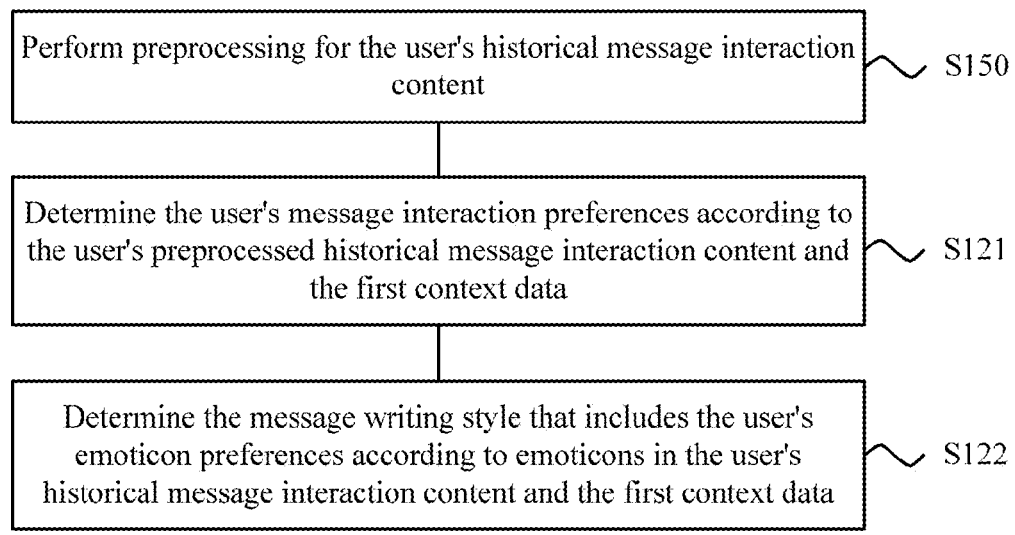
FIG. 2 is another schematic flowchart of a message processing method according to an embodiment of the present invention.

In the embodiment of the present invention, optionally, as shown in FIG. 2, the method 100 further includes the following steps:

S150. Perform preprocessing for the user's historical message interaction content.

The determining the user's message interaction preferences in S120 includes:

S121. Determine the user's message interaction preferences according to the user's preprocessed historical message interaction content and the first context data.

For example, the message processing apparatus may first perform natural language processing for the historical message interaction content included in the historical message interaction information, and determine the user's message interaction preferences according to the user's historical message interaction content that have undergone the natural language processing and according to the first context data. Further, for example, the obtained historical message interaction content may be associated with and aligned with the context data, and encapsulated into a data unit and used as an input of statistic-based learning.

It should be understood that, the natural language processing may include word segmentation, annotation of part of speech, recognition of named entities, and syntax analysis. It should be understood that, other specific preprocessing methods may also be included, such as removing blank SMS messages, removing repeated SMS messages, or add context information; and the embodiment of the present invention is not limited to such preprocessing methods. It should also be understood that, in the embodiment of the present invention, the statistic analysis information used in the present invention may be the original content of the message, or a word segmentation result of the preprocessed message, or structured semantic data after semantic analysis, and the embodiment of the present invention is not limited to that.

In the embodiment of the present invention, optionally, as shown in FIG. 2, the determining the user's message interaction preferences includes the following steps:

S122. Determine the message writing style that includes the user's emoticon preferences according to emoticons in the user's historical message interaction content and the first context data.

For example, a user uses favorable emoticons when replying to an SMS message of his girlfriend, but uses no emoticon when replying to an SMS message of his supervisor. Therefore, the apparatus may learn the emoticon preferences of the user to further enhance user experience.

It should be understood that, the message processing apparatus may perform statistic-based learning for the user's emoticon preferences according to the obtained user's historical message interaction information and the first context data; and the message processing apparatus may also perform statistic learning for the user's emoticon preferences after preprocessing the user's historical message interaction information and the first context data, that is, S122 may be performed after S110 or S150, and the embodiment of the present invention is not limited to that.

It should be understood that, in the embodiment of the present invention, the statistic-based learning method is independent of natural language processing technologies of a specific language, such as word segmentation and semantic analysis. Therefore, the system application environments of the embodiment of the present invention are not limited to Chinese, and can be conveniently extended to automatic message replying in various languages.

In the embodiment of the present invention, the message processing apparatus may perform statistic learning for the user's historical message interaction information and corresponding context data, and the message processing apparatus may also perform statistic learning in light of other users' historical message interaction information and corresponding context data.

Figure 3:
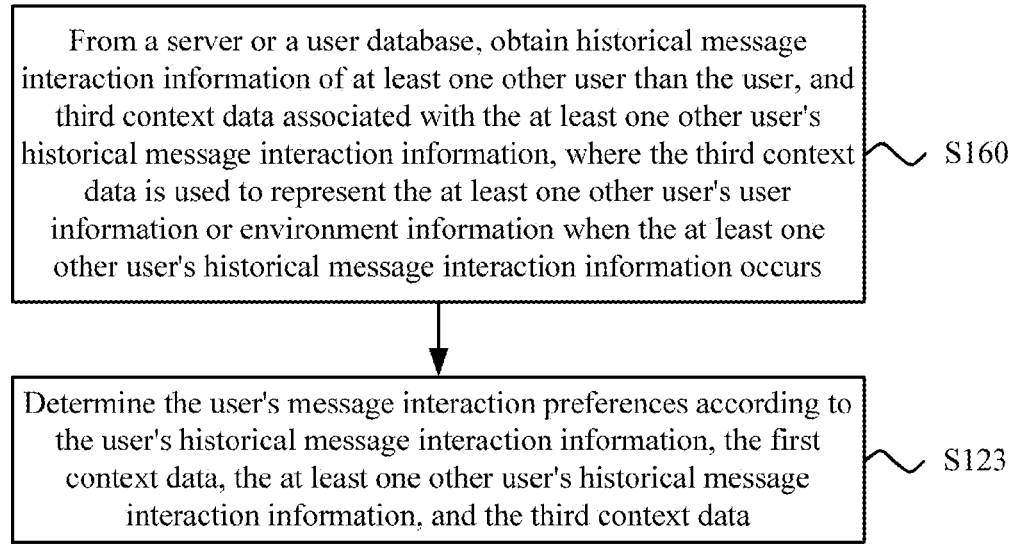
FIG. 3 is still another schematic flowchart of a message processing method according to an embodiment of the present invention.

Specifically, optionally, as shown in FIG. 3, the method 100 further includes the following steps:

S160. From a server or a user database, obtain historical message interaction information of at least one other user than the user, and third context data associated with the at least one other user's historical message interaction information, where the third context data is used to represent the at least one other user's user information or environment information when the at least one other user's historical message interaction information occurs.

The determining the user's message interaction preferences in S120 includes:

S123. Determine the user's message interaction preferences according to the user's historical message interaction information, the first context data, the at least one other user's historical message interaction information, and the third context data.

In the embodiment of the present invention, optionally, the third context data includes at least one of the following information: the user's schedule, the user's location information, the user's moving manner information, and the user's surroundings information.

For example, user A knows little about cultural relic appreciation, but user A receives a message from a friend consulting about cultural relic questions. If the message processing apparatus can perform statistic-based learning from the historical message interaction information of user C who is proficient in cultural relic appreciation, and can thus give constructive opinions to the friend of user A, the user experience is improved significantly.

In the embodiment of the present invention, the at least one other user's historical message interaction information may include the historical message interaction information between other users, and may include the historical message interaction information between other users and the user who uses the terminal. The embodiment of the present invention is not limited to that.

It should be understood that, the message processing apparatus may request other user's historical message interaction information and corresponding third context data from other users; and the message processing apparatus may also obtain other user's historical message interaction information and corresponding third context data from a network device, for example, obtain the foregoing information and data from an OSS of a service provider. Certainly, the message processing apparatus may also use other methods to obtain the information and data, and the embodiment of the present invention is not limited to that.

Figure 4:
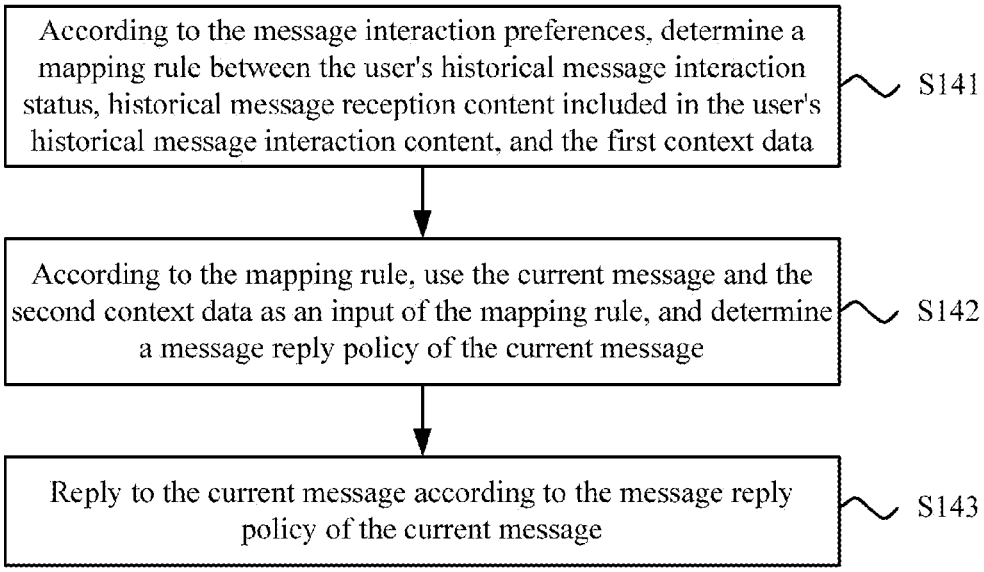
FIG. 4 is a schematic flowchart of a method for replying to a current message according to an embodiment of the present invention.
Figure 5:
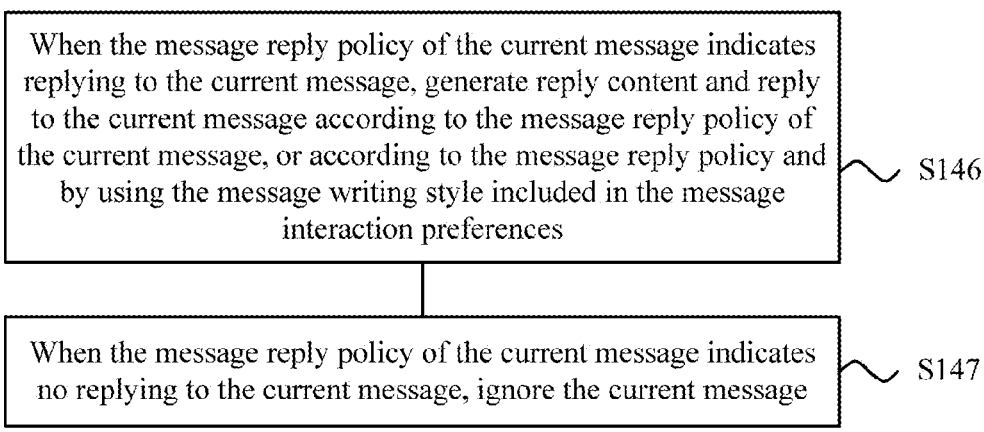
FIG. 5 is another schematic flowchart of a method for replying to a current message according to an embodiment of the present invention.

The following describes a method 140 for replying to a current message according to an embodiment of the present invention with reference to FIG. 4 to FIG. 7. As shown in FIG. 4, the replying to the current message includes the following steps:

S141. According to the message interaction preferences, determine a mapping rule between the user's historical message interaction status, historical message reception content included in the user's historical message interaction content, and the first context data.

S142. According to the mapping rule, use the current message and the second context data as an input of the mapping rule, and determine a message reply policy of the current message.

S143. Reply to the current message according to the message reply policy of the current message.

Specifically, in S143, optionally, the replying to the current message according to the message reply policy of the current message includes the following step:

S146. When the message reply policy of the current message indicates replying to the current message, generate reply content and reply to the current message according to the message reply policy of the current message, or according to the message reply policy and by using the message writing style included in the message interaction preferences; or S147. When the message reply policy of the current message indicates no replying to the current message, ignore the current message.

Specifically, when the message processing apparatus determines replying to the current message according to the message reply policy, the message processing apparatus may generate reply content and reply to the current message according to the message reply policy of the current message and the message writing style included in the message interaction preferences; and, in addition, when the message processing apparatus determines no replying to the current message according to the message reply policy, the message processing apparatus may ignore the current message.

Therefore, in the message processing method in the embodiment of the present invention, the user's message interaction preferences are determined according to the historical message interaction information and the context data associated with the user's historical message interaction information, and the current message can be replied to automatically according to the message interaction preferences, and therefore, the message reply caters for the user's personality and preferences and adapts to the message reception context, and the user experience is enhanced significantly.

Figure 6:
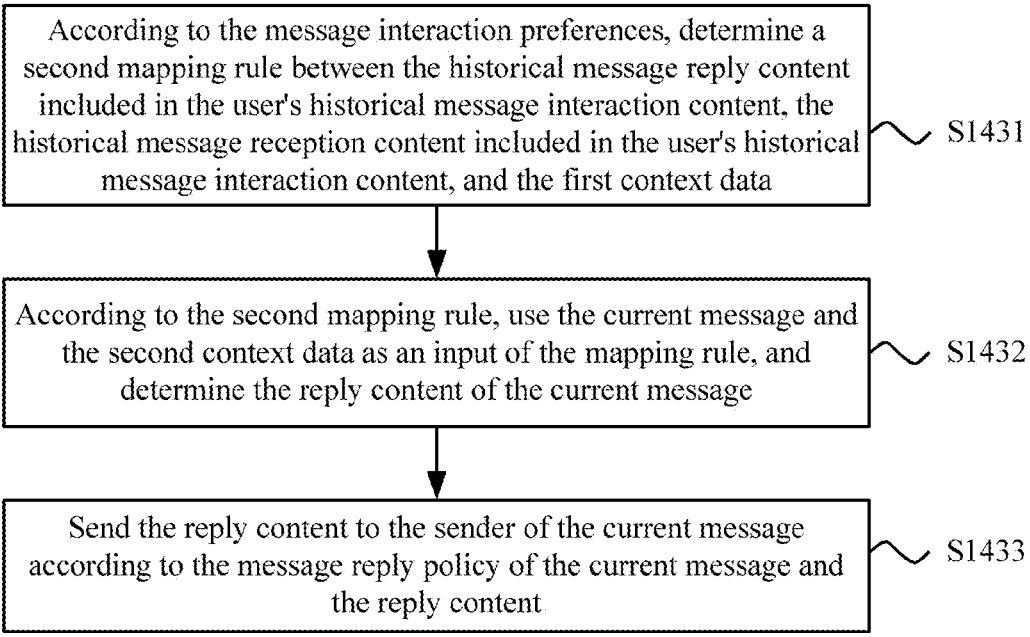
FIG. 6 is still another schematic flowchart of a method for replying to a current message according to an embodiment of the present invention.

In the embodiment of the present invention, optionally, as shown in FIG. 6, the generating reply content and replying to the current message includes the following steps:

S1431. According to the message interaction preferences, determine a second mapping rule between the historical message reply content included in the user's historical message interaction content, the historical message reception content included in the user's historical message interaction content, and the first context data.

S1432. According to the second mapping rule, use the current message and the second context data as an input of the mapping rule, and determine the reply content of the current message.

S1433. Send the reply content to a sender of the current message according to the message reply policy of the current message and the reply content.

In the embodiment of the present invention, when the message processing apparatus determines replying to the current message according to the message reply policy, the message processing apparatus may generate reply content and display it to the user, where the reply content is sent after being confirmed by the user. The message processing apparatus may also generate two or more pieces of reply content according to conditions, and provide them for the user to select, so that the message reply better caters for the user's personal preferences and contexts.

Figure 7:
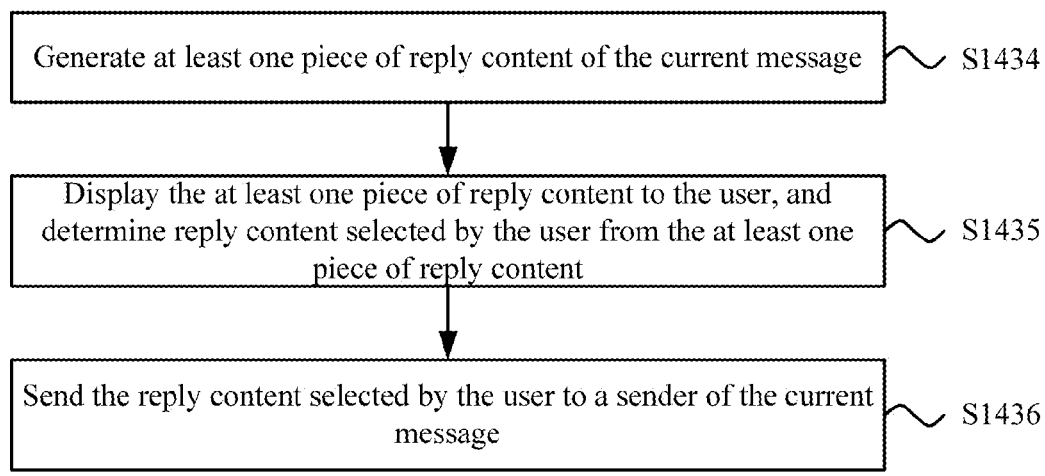
FIG. 7 is still another schematic flowchart of a method for replying to a current message according to an embodiment of the present invention.

Specifically, optionally, as shown in FIG. 7, the generating reply content and replying to the current message includes the following steps:

S1434. Generate at least one piece of reply content of the current message.

S1435. Display the at least one piece of reply content to the user, and determine reply content selected by the user from the at least one piece of reply content.

S1436. Send the reply content selected by the user to a sender of the current message.

It should be understood that, in the embodiment of the present invention, according to the specific message content and the context data, the message processing apparatus may send the reply message to not only the sender of the current message but also at least one other recipient than the sender of the current message, and the embodiment of the present invention is not limited to that.

Figure 8:
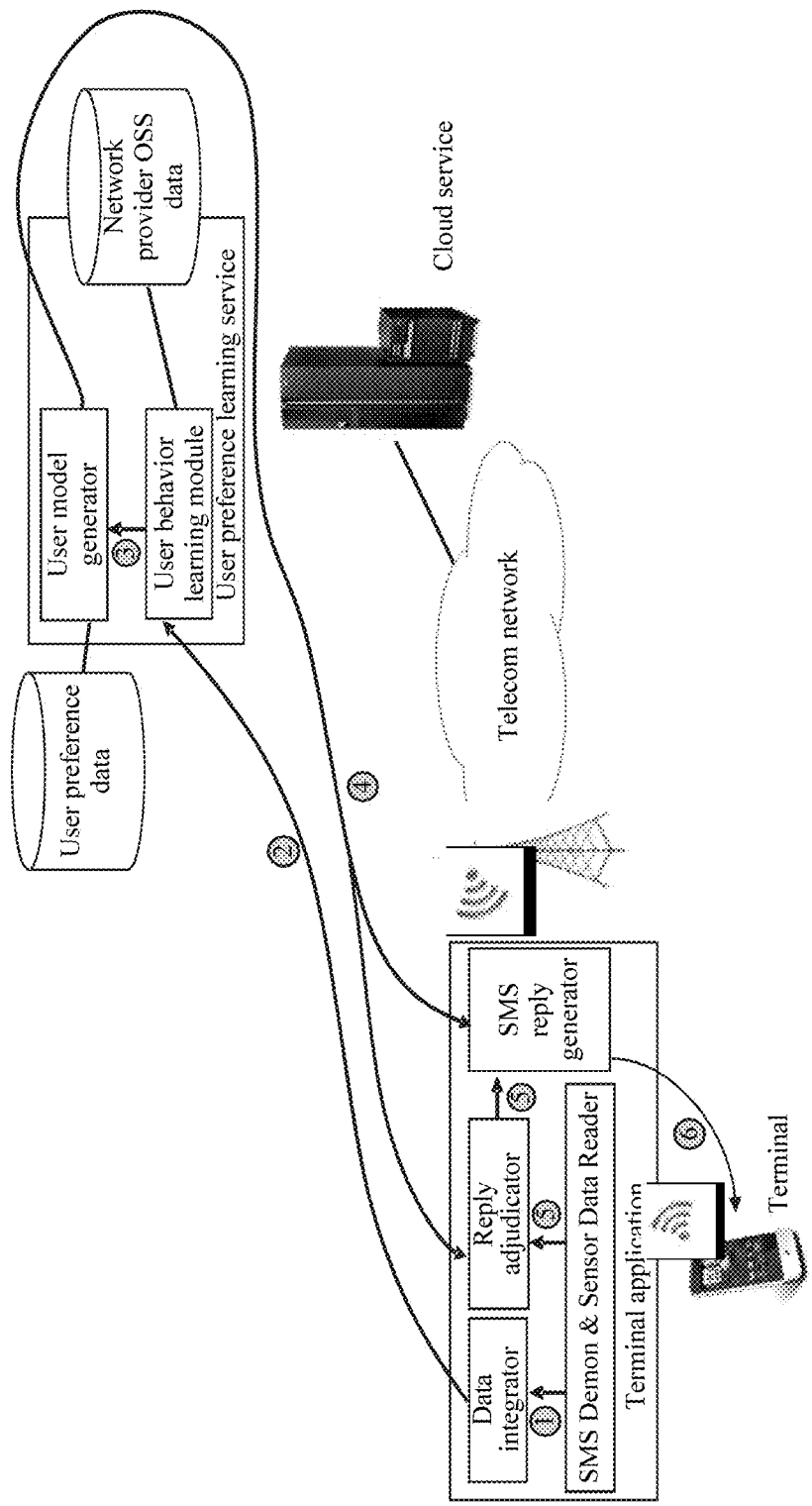
FIG. 8 is still another schematic flowchart of a message processing method according to an embodiment of the present invention.

The following describes a message processing method according to an embodiment of the present invention with reference to FIG. 8, by using an example in which a terminal and a server jointly perform a method of processing an SMS message.

As shown in FIG. 8, an automatic message processing system may include a terminal and a cloud service. The terminal application may include the following components: an SMS message content and context collecting module (e.g. a SMS Demon & Sensor Data Reader (SDR)), a data integrator (DI), a reply adjudicator (RA), and an SMS reply generator (SRG). A cloud user preference learning service may include the following components: a user behavior statistics and learning module (UBLM), a user model generator (UMG), and a user preference database (UPD).

The SMS message content and context collecting module (SMS Daemon & Sensor Data Reader) may be configured to collect SMS message content (including received SMS messages and replied messages) and context data; the data integrator may be configured to associate and align the SMS message content with the context data, and encapsulate them into a data unit as an input of statistic-based learning; the reply adjudicator may give a reply policy of the received SMS message according to user preferences, where the policy may be, for example, immediate reply; the cloud service may set the reply adjudicator to make its adjudication consistent with the personality of the user of the terminal; and the SMS Reply Generator may generate reply content according to the user preferences and context information when replying to the SMS message is determined, and the cloud service may also set the SMS Reply Generator to make its replying consistent with the personality of the terminal user.

The user behavior statistics and learning module (User Behavior Learning Module) may be configured to receive an SMS message data unit (including SMS message content and a context) from a terminal application, and perform statistic-based learning for the user preferences and the writing habit by combining network-side information (OSS data from a service provider, including the user's historical SMS message interaction records, and so on). In the learning process, this module may aggregate the data of multiple users who have similar habits, and learn them together. The user model generator is configured to generate an SMS message reply model that matches each user for the user according to a result of the statistic learning. The model may include two parts: a reply policy model (RPM) and a personal style content generation model (PSCGM). The user model generator may use a user preference database to store SMS message reply models of different users; and the user model generator may also arrange the RPM into the reply adjudicator and arrange the PSCGM into the SMS reply generator, so that the terminal application demonstrates the same style as the terminal holder when replying to the SMS message. The user preference database is configured to store each user's SMS message reply behavior model, and the user model generator UMG may perform operations such as addition, deletion, update, and search (Add/Delete/Update/Index) for the content in the database.

The terminal and the cloud service may perform automatic reply to the SMS message, for example, in the following procedure:

1. The SDR of the terminal may collect the SMS message content and the context data, and submit the collected data to the DI.

2. The DI may clean and encapsulate data, and submit the encapsulated data unit to the cloud service in the daemon.

3. The UBLM module of the cloud service may combine the data on the terminal application with the historical data on the network side, and perform statistic-based learning to obtain the user preferences, and the UMG may generate the user's RPM/PSCGM, and backs up/updates it to the user preference database.

4. The UMG may configure the model onto the RA and the SRG module on the application side of the terminal.

5. When the terminal receives the SMS message, the SMS message content and the associated context information may be forwarded to the RA and the SRG module, the RA may decide the reply policy of the SMS message according to the user's RPM, and, if replying is required, the SRG may generate reply content according to the user's PSCGM.

6. The terminal presents the reply content onto the terminal screen, and may send the reply content after the user confirms it.

The following uses another specific implementation scenario as an example to describe the method, but the embodiment of the present invention is not limited to the scenario.

For example, according to historical message interaction records, the message processing apparatus learns that historical statistics of replies from user E to her boyfriend user F, which are roughly listed in Table 2:

TABLE 2

| Serial Number | Template number | Accept or not | Reply policy | Reply content | Probability |
|---|---|---|---|---|---|
| 1 | Template 1 | Accept | Reply immediately | "Go to a concert" | 12% |
| 2 | Template 2 | Accept | Reply immediately | "Watch a movie" | 11% |
| 3 | Template 3 | Accept | Reply immediately | "Have a walk" | 10% |
| 4 | Template 4 | Reject | Reply immediately | "Feel unwell. I'd better not go" | 10% |
| 5 | Template 5 | Reject | Reply later | "Sorry. I missed the message. Time is not enough now" | 8% |
| 6 | Template 6 | Accept | Reply immediately | "I support you" | 7% |
| 7 | Template 7 | XX | XX | "..." | ... |

Assuming that user E has a bad mood and is walking beside a lake when she receives a message "I will have a day off tomorrow, and I will have all day to be with you. What would you like to do?" from her boyfriend user F. Therefore, the RA module of the terminal may perform PSCGM analysis and determine that template 1 is applicable to replying to the message. However, because the probabilities of several possible replies are close to each other, the terminal may determine that the reply policy of the current message is immediate reply, and may determine to use statistic reply template 1, template 2, template 3, or template 4 to reply.

The UMG module may learn from the context data associated with the current message that the weather conditions in the coming few days are overcast and rainy, which is unsuitable for having a walk. Therefore, the UMG module may select template 1, template 2, and template 4, and create message reply options: "Go to a concert", "Watch a movie", and "Feel unwell. I'd better not go". The terminal displays the three message reply options on the screen for user E to select.

User E has a bad mood and selects the reply "Feel unwell. I'd better not go", and therefore, the terminal sends the reply selected by user E to user F.

Therefore, in the message processing method in the embodiment of the present invention, the user's message interaction preferences are determined according to the historical message interaction information and the context data associated with the user's historical message interaction information, and the current message can be replied to automatically according to the message interaction preferences, and therefore, the message reply caters for the user's personality and preferences and adapts to the message reception context, and the user experience is enhanced significantly.

It should be understood that, in various embodiments of the present invention, the sequence number of each process does not represent order of implementation, and the order of implementing the processes depends on their functions and inherent logics, and shall not constitute any limitation on the implementation process of the embodiments of the present invention.

The message processing method according to the embodiments of the present invention has been detailed above with reference to FIG. 1 to FIG. 8, and the following describes a message processing terminal and system according to the embodiments of the present invention with reference to FIG. 9 to FIG. 17.

Figure 9:
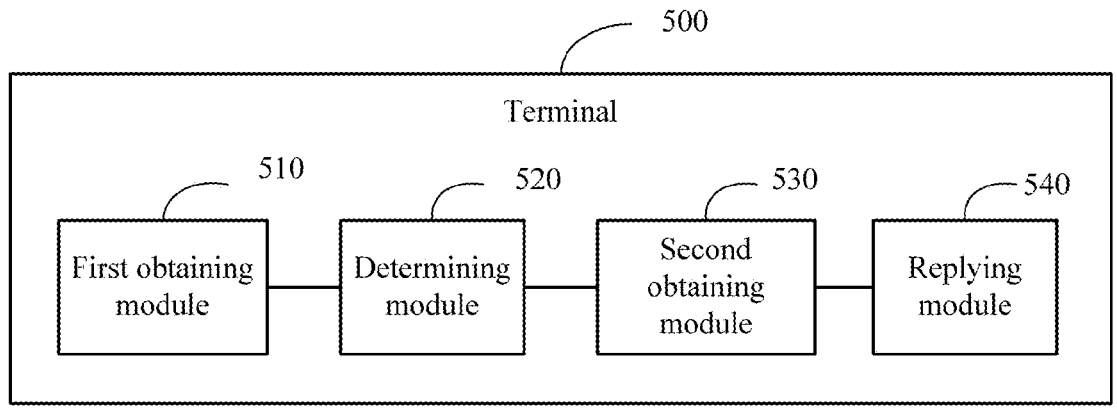
FIG. 9 is a schematic block diagram of a terminal according to an embodiment of the present invention.

FIG. 9 is a schematic block diagram of a terminal 500 according to an embodiment of the present invention. As shown in FIG. 9, the terminal 500 includes: a first obtaining module 510 configured to obtain a user's historical message interaction information and first context data associated with the user's historical message interaction information, where the user's historical message interaction information includes historical message interaction content and historical message replying status, and the first context data is used to represent user information or environment information when the user's historical message interaction information occurs; a determining module 520 configured to determine the user's message interaction preferences according to the user's historical message interaction information and the first context data that are obtained by the first obtaining module 510, where the message interaction preferences include a message reply policy and/or a message writing style; a second obtaining module 530 configured to receive a current message sent to the user, and obtain second context data associated with the current message, where the second context data is used to represent user information or environment information when the user's current message occurs; and a replying module 540 configured to reply to the current message according to the message interaction preferences determined by the determining module 520 and the current message and the second context data that are obtained by the second obtaining module 530.

Therefore, in the message processing terminal in the embodiment of the present invention, the user's message interaction preferences are determined according to the historical message interaction information and the context data associated with the user's historical message interaction information, and the current message can be replied automatically according to the message interaction preferences, and therefore, the message reply caters for the user's personality and preferences and adapts to the message reception context, and the user experience is enhanced significantly.

Figure 10:
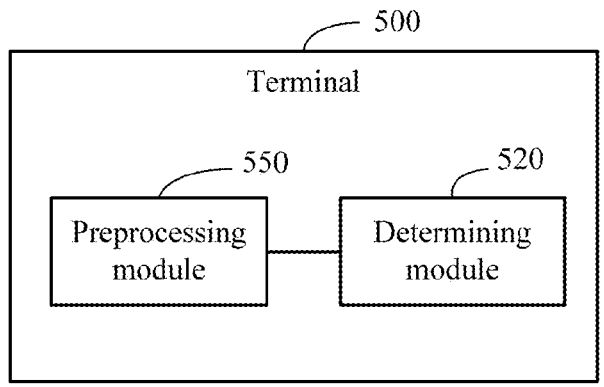
FIG. 10 is another schematic block diagram of a terminal according to an embodiment of the present invention.

In the embodiment of the present invention, optionally, as shown in FIG. 10, the terminal 500 further includes: a preprocessing module 550 configured to perform preprocessing for the user's historical message interaction content, where the determining module 520 is configured to determine the user's message interaction preferences according to the user's historical message interaction content preprocessed by the preprocessing module 550 and the first context data.

In the embodiment of the present invention, optionally, the determining module 520 is further configured to determine the message writing style that includes the user's emoticon preferences according to emoticons in the user's historical message interaction content and the first context data.

In the embodiment of the present invention, optionally, the determining module 520 is configured to determine the user's message interaction preferences in a statistic-based learning manner.

Figure 11:
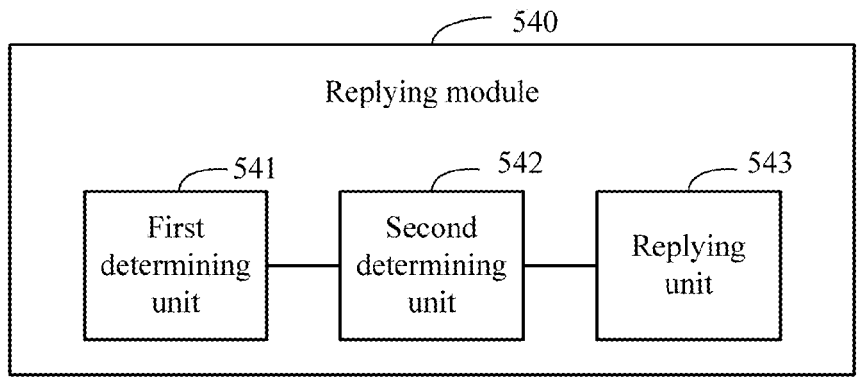
FIG. 11 is a schematic block diagram of a replying module according to an embodiment of the present invention.

In the embodiment of the present invention, optionally, as shown in FIG. 11, the replying module 540 includes: a first determining unit 541 configured to determine, according to the message interaction preferences, a mapping rule between the user's historical message interaction status, historical message reception content included in the user's historical message interaction content, and the first context data; a second determining unit 542 configured to use, according to the mapping rule determined by the first determining unit 541, the current message and the second context data as an input of the mapping rule, and determine a message reply policy of the current message; and a replying unit 543 configured to reply to the current message according to the message reply policy of the current message, where the policy is determined by the second determining unit 542.

In the embodiment of the present invention, optionally, the replying unit 543 is configured to generate, when the message reply policy of the current message indicates replying to the current message, reply content and reply to the current message according to the message reply policy of the current message, or according to the message reply policy and by using the message writing style included in the message interaction preferences; or when the message reply policy of the current message indicates no replying to the current message, ignore the current message.

Figure 12:
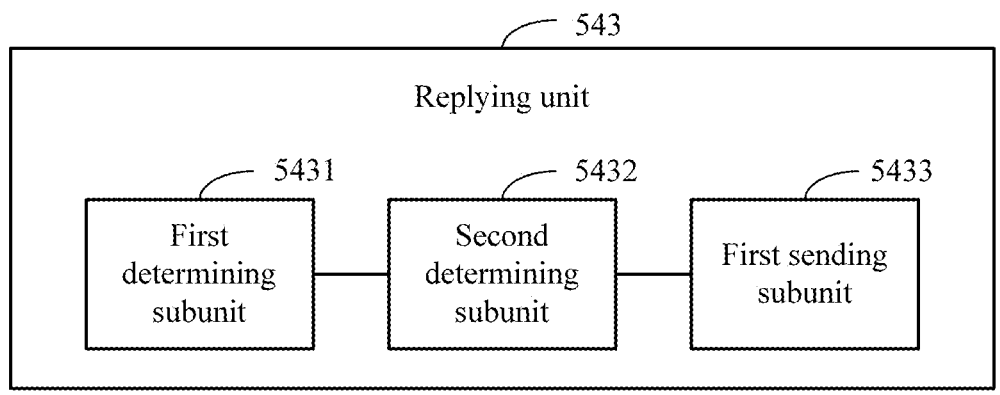
FIG. 12 is a schematic block diagram of a replying unit according to an embodiment of the present invention.

In the embodiment of the present invention, optionally, as shown in FIG. 12, the replying unit 543 includes: a first determining subunit 5431 configured to determine, according to the message interaction preferences, a second mapping rule between the historical message reply content included in the user's historical message interaction content, the historical message reception content included in the user's historical message interaction content, and the first context data; a second determining subunit 5432 configured to use according to the second mapping rule determined by the first determining subunit 5431, the current message and the second context data as an input of the mapping rule, and determine reply content of the current message; and a first sending subunit 5433 configured to send the reply content to a sender of the current message according to the message reply policy of the current message and the reply content determined by the second determining subunit 5432.

Figure 13:
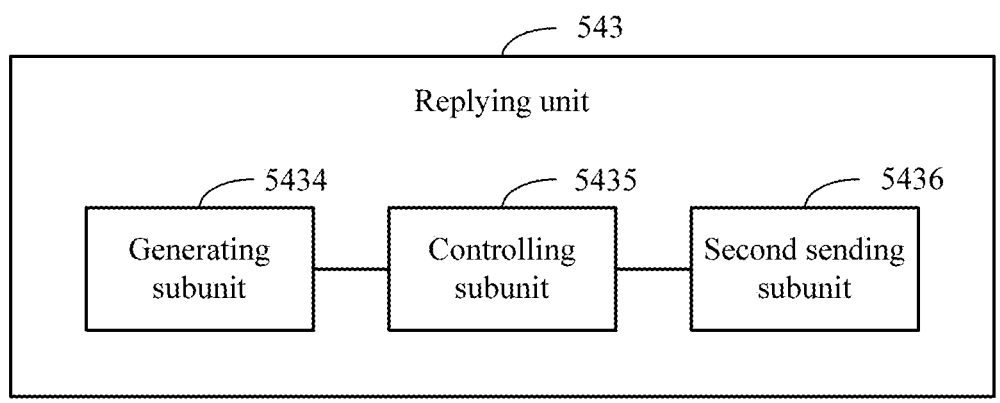
FIG. 13 is another schematic block diagram of a replying unit according to an embodiment of the present invention.

In the embodiment of the present invention, optionally, as shown in FIG. 13, the replying unit 543 includes: a generating subunit 5434 configured to generate at least one piece of reply content of the current message according to the message reply policy of the current message, where the policy is determined by the second determining unit 542; a controlling subunit 5435 configured to display the at least one piece of reply content generated by the generating subunit 5434 to the user, and determine reply content selected by the user from the at least one piece of reply content; and a second sending subunit 5436 configured to send the reply content selected by the user and determined by the controlling subunit 5435 to the sender of the current message.

In the embodiment of the present invention, optionally, the user information or environment information includes at least one of the following information: the user's schedule, the user's location information, the user's moving manner information, and the user's surroundings information. That is, the first context data or the second context data includes at least one of the following information: the user's schedule, the user's location information, the user's moving manner information, and the user's surroundings information.

In the embodiment of the present invention, optionally, the message reply policy includes at least one of the following information: whether to reply to the message, a manner of replying to the message, time of replying to the message, and environment conditions of replying to the message.

In the embodiment of the present invention, optionally, the message writing style includes at least one of the following information: replying manner, replying tone, and frequently used words and sentence patterns.

In the embodiment of the present invention, optionally, the message includes an SMS message, an instant message, a direct message of microblog, or a WeChat message.

It should be understood that, the message processing terminal 500 according to the embodiment of the present invention may correspond to the message processing apparatus for implementing the method 100 in the embodiments of the present invention, and the foregoing and other operations and/or functions of each module of the terminal 500 are separately intended to implement corresponding processes of the method 100 in FIG. 1 to FIG. 8. For brevity, no repeated description is given here any further.

Therefore, in the message processing terminal in the embodiment of the present invention, the user's message interaction preferences are determined according to the historical message interaction information and the context data associated with the user's historical message interaction information, and the current message can be replied automatically according to the message interaction preferences, and therefore, the message reply caters for the user's personality and preferences and adapts to the message reception context, and the user experience is enhanced significantly.

Figure 14:
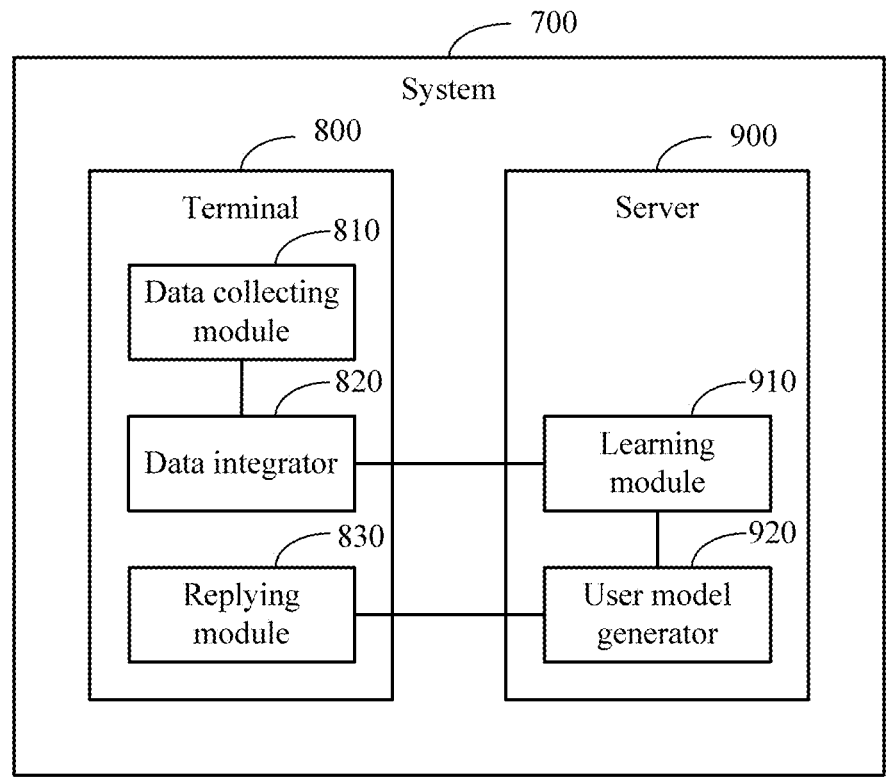
FIG. 14 is a schematic block diagram of a system according to an embodiment of the present invention.

FIG. 14 is a schematic block diagram of a system 700 according to an embodiment of the present invention. As shown in FIG. 14, the system 700 includes a terminal 800 and a server 900, and the terminal 800 includes: a data collecting module 810 configured to obtain a user's historical message interaction information and first context data associated with the user's historical message interaction information, where the first context data is used to represent user information or environment information when the user's historical message interaction information occurs; and a data integrator 820 configured to integrate the user's historical message interaction information and the first context data that are obtained by the data collecting module 810 to obtain a data format suitable for learning and inputting, and send the integrated data in the data format to the server 900.

The server 900 includes: a learning module 910 configured to receive the data in the data format sent from the data integrator 820, and perform statistic-based learning for the user's message interaction preferences according to the data, where the message interaction preferences include a reply policy and/or a message writing style; and a user model generator 920 configured to configure a reply policy model and a content generation model for the terminal according to a result of the statistic-based learning performed by the learning module 910.

The data collecting module 810 is further configured to receive a current message sent to the user, and obtain second context data associated with the current message, where the second context data is used to represent user information or environment information when the user's current message occurs.

The terminal 800 further includes: a replying module 830 configured to reply to the current message according to the reply policy model and the content generation model that are configured by the user model generator 920 and the current message and the second context data that are obtained by the data collecting module 810.

Therefore, in the message processing system in the embodiment of the present invention, the user's message interaction preferences are determined according to the historical message interaction information and the context data associated with the user's historical message interaction information, and the current message can be replied to automatically according to the message interaction preferences, and therefore, the message reply caters for the user's personality and preferences and adapts to the message reception context, and the user experience is enhanced significantly.

In the embodiment of the present invention, optionally, the data integrator 820 is configured to preprocess historical message interaction content included in the user's historical message interaction information obtained by the data collecting module 810, integrate the user's preprocessed historical message interaction content to obtain a data format suitable for learning and inputting, and send the integrated data in the data format to the server.

In the embodiment of the present invention, optionally, the learning module 910 is further configured to perform statistic learning for emoticon preferences in the user message interaction according to emoticons in the historical message interaction content included in the user's historical message interaction information and the first context data, so as to determine the message writing style that includes the user's emoticon preferences.

Figure 15:
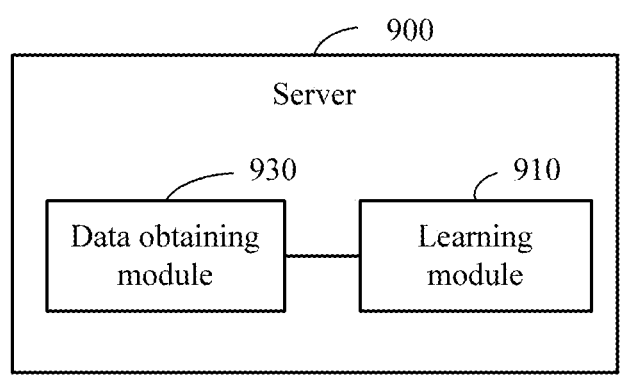
FIG. 15 is a schematic block diagram of a server according to an embodiment of the present invention.

In the embodiment of the present invention, optionally, as shown in FIG. 15, the server 900 further includes: a data obtaining module 930 configured to obtain, from a server or a user database, historical message interaction information of at least one other user than the user, and third context data associated with the at least one other user's historical message interaction information, where the third context data is used to represent the at least one other user's user information or environment information when the at least one other user's historical message interaction information occurs.

The learning module 910 is further configured to perform statistic learning for the user's message interaction preferences according to the data in the data format, which is sent by the data integrator 820, and according to the at least one other user's historical message interaction information and the third context data that are obtained by the data obtaining module 930.

Figure 16:
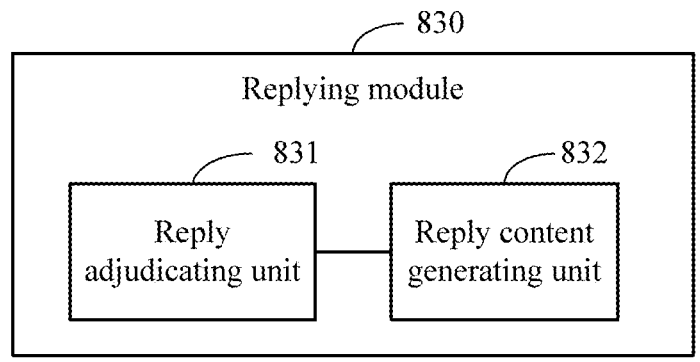
FIG. 16 is a schematic block diagram of a replying module according to an embodiment of the present invention.

In the embodiment of the present invention, optionally, as shown in FIG. 16, the replying module 830 includes: a reply adjudicating unit 831 configured to use, according to the reply policy model, the current message and the second context data as an input of the reply policy model, and determine a reply policy of the current message.

In the embodiment of the present invention, optionally, as shown in FIG. 16, the replying module 830 further includes: a reply content generating unit 832 configured to generate, when the reply adjudicating unit 831 determines that the reply policy of the current message is replying to the current message, reply content and reply to the current message according to the reply policy of the current message and the content generation model.

Figure 17:
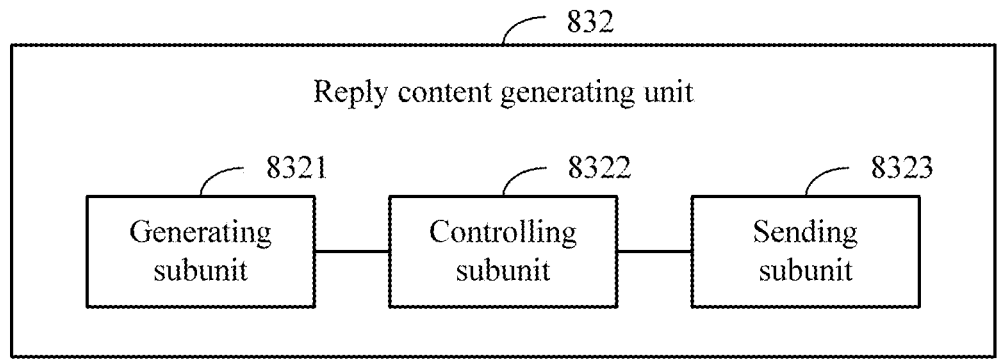
FIG. 17 is a schematic block diagram of a reply content generating unit according to an embodiment of the present invention.

In the embodiment of the present invention, optionally, as shown in FIG. 17, the reply content generating unit 832 includes: a generating subunit 8321 configured to generate at least one piece of reply content of the current message according to the content generation model, the current message, and the second context data; a controlling subunit 8322 configured to display the at least one piece of reply content generated by the generating subunit 8321 to the user, and determine reply content selected by the user from the at least one piece of reply content; and a sending subunit 8323 configured to send the reply content selected by the user and determined by the controlling subunit 8322 to a sender of the current message.

In the embodiment of the present invention, optionally, the user information or environment information includes at least one of the following information: a message sender, message content, the user's schedule, the user's location information, the user's moving manner information, and the user's surroundings information.

In the embodiment of the present invention, optionally, the message interaction preferences include a message reply policy, and the message reply policy includes at least one of the following information: whether to reply to the message, a manner of replying to the message, time of replying to the message, and environment conditions of replying to the message.

In the embodiment of the present invention, optionally, the message interaction preferences include a message writing style, and the message writing style includes at least one of the following information: replying manner, replying tone, and frequently used words and sentence patterns.

In the embodiment of the present invention, optionally, the message includes an SMS message, an instant message, a direct message of microblog, or a WeChat message.

It should be understood that, the message processing system 700 according to the embodiment of the present invention may correspond to the message processing apparatus for implementing the method 100 in the embodiments of the present invention, and the foregoing and other operations and/or functions of each module of the system 700 are separately intended to implement corresponding processes of the method 100 in FIG. 1 to FIG. 8. For brevity, no repeated description is given here any further.

Therefore, in the message processing system in the embodiment of the present invention, the user's message interaction preferences are determined according to the historical message interaction information and the context data associated with the user's historical message interaction information, and the current message can be replied to automatically according to the message interaction preferences, and therefore, the message reply caters for the user's personality and preferences and adapts to the message reception context, and the user experience is enhanced significantly.

Figure 18:
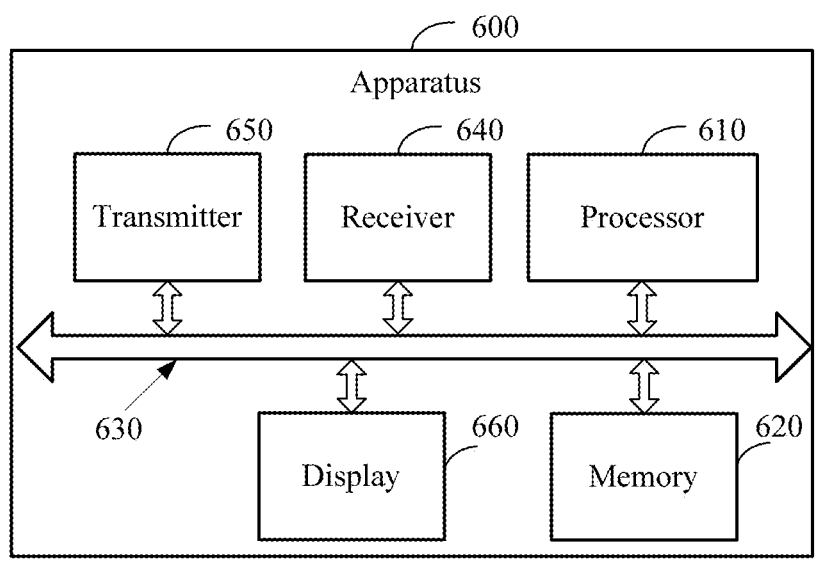
FIG. 18 is a schematic structural diagram of a message processing apparatus according to an embodiment of the present invention.

The present invention further provides a message processing apparatus. As shown in FIG. 18, the apparatus 600 includes a processor 610, a memory 620, a bus system 630, and a receiver 640. The processor 610, the memory 620, and the receiver 640 are connected through the bus system 630. The memory 620 is configured to store instructions. The processor 610 is configured to execute the instructions stored in the memory 620. The processor 610 is configured to obtain a user's historical message interaction information and first context data associated with the user's historical message interaction information, where the user's historical message interaction information includes historical message interaction content and historical message replying status, and the first context data is used to represent user information or environment information when the user's historical message interaction information occurs; the processor 610 is further configured to determine the user's message interaction preferences according to the user's historical message interaction information and the first context data, where the message interaction preferences include a message reply policy and/or a message writing style; the receiver 640 is configured to receive a current message sent to the user, and obtain second context data associated with the current message, where the second context data is used to represent user information or environment information when the user's current message occurs; and the processor 610 is further configured to reply to the current message according to the message interaction preferences, the current message, and the second context data.

Therefore, with the message processing apparatus in the embodiment of the present invention, the user's message interaction preferences are determined according to the historical message interaction information and the context data associated with the user's historical message interaction information, and the current message can be replied to automatically according to the message interaction preferences, and therefore, the message reply caters for the user's personality and preferences and adapts to the message reception context, and the user experience is enhanced significantly.

It should be understood that, in the embodiment of the present invention, the processor 610 may be a central processing unit (CPU), and the processor 610 may also be another universal processor, a digital signal processor (DSP), an application-specific integrated circuit (ASIC), a field programmable gate array (FPGA) or another programmable logical device, a discrete gate or a transistor logic device, a discrete hardware assembly, or the like. The universal processor may be a microprocessor or any conventional processor.

The memory 620 may include a read-only memory and a random access memory, and provide instructions and data for the processor 610. A part of the memory 620 may further include a non-volatile random access memory. For example, the memory 620 may store information about device types.

The bus system 630 includes not only a data bus, but may also include a power supply bus, a control bus, a state signal bus, and so on. However, for clarity, all kinds of buses are uniformly referred to as a bus system 630 in FIG. 18.

In the implementation process, the steps of the method may be implemented by integrated logic circuits of hardware in the processor 610 or by software instructions. The steps of the method disclosed in the embodiments of the present invention may be directly executed by a hardware processor, or by a combination of hardware and software modules in the processor. The software modules may reside in a random access memory, a flash memory, a read-only memory, a programmable read-only memory, an electrically erasable programmable Read-Only Memory (ROM), a register, or any other storage media that are mature in the art. The storage media are located in the memory 620, and the processor 610 reads information in the memory 620, and works together with its hardware to implement the steps of the method. To avoid repetition, no more details are given here.

Optionally, in an embodiment, the processor 610 is configured to preprocess the user's historical message interaction content, and determine the user's message interaction preferences according to the user's preprocessed history message interaction content and the first context data.

Optionally, in another embodiment, the determining, by the processor 610, the user's message interaction preferences, includes determining the message writing style that includes the user's emoticon preferences according to emoticons in the user's historical message interaction content and the first context data.

Optionally, in another embodiment, the processor 610 is configured to obtain from a server or a user database, historical message interaction information of at least one other user than the user, and third context data associated with the at least one other user's historical message interaction information, where the third context data is used to represent the at least one other user's user information or environment information when the at least one other user's historical message interaction information occurs, where the determining, by the processor 610, the user's message interaction preferences, includes determining the user's message interaction preferences according to the user's historical message interaction information, the first context data, the at least one other user's historical message interaction information, and the third context data.

Optionally, in another embodiment, the determining, by the processor 610, the user's message interaction preferences, includes determining the user's message interaction preferences in a statistic-based learning manner.

Optionally, in another embodiment, the replying, by the processor 610, to the current message, includes determining, according to the message interaction preferences, a mapping rule between the user's historical message interaction status, historical message reception content included in the user's historical message interaction content, and the first context data; according to the mapping rule, using the current message and the second context data as an input of the mapping rule, and determining a message reply policy of the current message; and replying to the current message according to the message reply policy of the current message.

Optionally, in another embodiment, the replying, by the processor 610, to the current message according to the message reply policy of the current message, includes generating, when the message reply policy of the current message indicates replying to the current message, reply content and replying to the current message according to the message reply policy of the current message, or according to the message reply policy and by using the message writing style included in the message interaction preferences; or, when the message reply policy of the current message indicates no replying to the current message, ignoring the current message.

Optionally, in another embodiment, the generating, by the processor 610, reply content and the replying to the current message, includes determining according to the message interaction preferences, a second mapping rule between the historical message reply content included in the user's historical message interaction content, the historical message reception content included in the user's historical message interaction content, and the first context data; and, according to the second mapping rule, using the current message and the second context data as an input of the mapping rule, and determining the reply content of the current message.

The apparatus 600 further includes a transmitter 650, and the transmitter 650 is configured to send the reply content to a sender of the current message according to the message reply policy of the current message and the reply content.

Optionally, in another embodiment, the generating, by the processor 610, reply content and the replying to the current message, includes generating at least one piece of reply content of the current message according to the message interaction preferences, the current message, and the second context data.

The apparatus 600 further includes a display 660, and the display 660 is configured to display the at least one piece of reply content to the user; the processor 610 is further configured to determine reply content selected by the user from the at least one piece of reply content; and the transmitter 650 is further configured to send the reply content selected by the user to the sender of the current message.

Optionally, in another embodiment, the user information or environment information includes at least one of the following information: a message sender, message content, the user's schedule, the user's location information, the user's moving manner information, and the user's surroundings information.

Optionally, in another embodiment, the message reply policy includes at least one of the following information: whether to reply to the message, a manner of replying to the message, time of replying to the message, and environment conditions of replying to the message.

Optionally, in another embodiment, the message writing style includes at least one of the following information: replying manner, replying tone, and frequently used words and sentence patterns.

Optionally, in another embodiment, the message includes an SMS message, an instant message, a direct message of microblog, or a WeChat message.

Therefore, in the message processing system in the embodiment of the present invention, the user's message interaction preferences are determined according to the historical message interaction information and the context data associated with the user's historical message interaction information, and the current message can be replied to automatically according to the message interaction preferences, and therefore, the message reply caters for the user's personality and preferences and adapts to the message reception context, and the user experience is enhanced significantly.

A person of ordinary skill in the art may be aware that, in combination with the examples described in the embodiments disclosed in this specification, units and steps of the methods may be implemented by electronic hardware, computer software, or a combination thereof. To clearly describe the interchangeability between the hardware and the software, the foregoing has generally described compositions and steps of each example according to functions. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and the parts displayed as units may or may not be physical units, may be located in one location, or may be distributed on a plurality of network units. Some or all of the units may be selected to achieve the objective of the solution of the embodiment of the present invention according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a Universal Serial Bus (USB) flash drive, a removable hard disk, a ROM, a random access memory (RAM), a magnetic disk, or an optical disc.

The foregoing descriptions are merely specific embodiments of the present invention, but are not intended to limit the protection scope of the present invention. Any equivalent variation or replacement readily figured out by a person skilled in the art within the technical scope of the present invention shall fall within the protection scope of the present invention. Therefore, the protection scope of the present invention shall be subject to the protection scope of the claims.

What is claimed is:

1. A message processing method, comprising:
obtaining a user's historical message interaction information and a first context data associated with the user's historical message interaction information, wherein the user's historical message interaction information comprises a historical message interaction content and a historical message replying status, and wherein the first context data is used to represent user information or environment information when the user's historical message interaction information occurs;

determining the user's message interaction preferences according to the user's historical message interaction information and the first context data, wherein the message interaction preferences comprise a message reply policy and/or a message writing style, wherein determining the user's message interaction preferences comprises determining the message writing style that includes the user's emoticon preferences according to emoticons in the user's historical message interaction content and the first context data;

receiving a current message sent to the user;

obtaining second context data associated with the current message, wherein the second context data is used to represent user information or environment information when the user's current message occurs; and replying to the current message according to the message interaction preferences, the current message, and the second context data.

2. The method according to claim 1, further comprising performing preprocessing for the user's historical message interaction content, wherein determining the user's message interaction preferences comprises determining the user's message interaction preferences according to the user's preprocessed historical message interaction content and the first context data.

3. The method according to claim 1, further comprising, obtaining, from a server or a user database, historical message interaction information of at least one other user than the user, and third context data associated with the at least one other user's historical message interaction information, wherein the third context data is used to represent the at least one other user's user information or environment information when the at least one other user's historical message interaction information occurs, and wherein determining the user's message interaction preferences comprises determining the user's message interaction preferences according to the user's historical message interaction information, the first context data, the at least one other user's historical message interaction information, and the third context data.

4. The method according to claim 1, wherein determining the user's message interaction preferences comprises determining the user's message interaction preferences in a statistic-based learning manner.

5. A message processing method, comprising:

obtaining a user's historical message interaction information and a first context data associated with the user's historical message interaction information, wherein the user's historical message interaction information comprises a historical message interaction content and a historical message replying status, and wherein the first context data is used to represent user information or environment information when the user's historical message interaction information occurs;

determining the user's message interaction preferences according to the user's historical message interaction information and the first context data, wherein the message interaction preferences comprise a message reply policy and/or a message writing style;

receiving a current message sent to the user;

obtaining second context data associated with the current message, wherein the second context data is used to represent user information or environment information when the user's current message occurs; and replying to the current message according to the message interaction preferences, the current message, and the second context data, wherein replying to the current message according to the message interaction preferences, the current message, and the second context data comprises:

determining, according to the message interaction preferences, a mapping rule between the user's historical message interaction status, historical message reception content included in the user's historical message interaction content, and the first context data;

using, according to the mapping rule, the current message and the second context data as an input of the mapping rule;

determining a message reply policy of the current message; and replying to the current message according to the message reply policy of the current message.

6. The method according to claim 5, wherein replying to the current message according to the message reply policy of the current message comprises:

generating reply content when the message reply policy of the current message indicates replying to the current message; and replying to the current message according to the message reply policy of the current message.

7. The method according to claim 5, wherein replying to the current message according to the message reply policy of the current message comprises:

generating reply content when the message reply policy of the current message indicates replying to the current message; and replying to the current message according to the message reply policy and by using the message writing style included in the message interaction preferences.

8. The method according to claim 5, wherein replying to the current message according to the message reply policy of the current message comprises ignoring the current message when the message reply policy of the current message indicates no replying to the current message.

9. A message processing terminal, comprising:

a first obtaining module implemented in hardware and configured to obtain a user's historical message interaction information and a first context data associated with the user's historical message interaction information, wherein the user's historical message interaction information comprises a historical message interaction content and a historical message replying status, and wherein the first context data is used to represent user information or environment information when the user's historical message interaction information occurs;

a determining module configured to:
    determine the user's message interaction preferences according to the user's historical message interaction information and the first context data that are obtained by the first obtaining module, wherein the message interaction preferences comprise a message reply policy and/or a message writing style; and
    determine the message writing style that includes the user's emoticon preferences according to emoticons in the user's historical message interaction content and the first context data;

a second obtaining module configured to:
    receive a current message sent to the user; and
    obtain second context data associated with the current message, wherein the second context data is used to represent user information or environment information when the user's current message occurs; and a replying module configured to reply to the current message according to the message interaction preferences determined by the determining module and the current message and the second context data that are obtained by the second obtaining module.

10. The terminal according to claim 9, further comprising a preprocessing module configured to perform preprocessing for the user's historical message interaction content, wherein the determining module is configured to determine the user's message interaction preferences according to the user's historical message interaction content preprocessed by the preprocessing module and the first context data.

11. The terminal according to claim 9, wherein the determining module is configured to determine the user's message interaction preferences in a statistic-based learning manner.

12. A message processing terminal, comprising:
a first obtaining module implemented in hardware and configured to obtain a user's historical message interaction information and a first context data associated with the user's historical message interaction information, wherein the user's historical message interaction information comprises a historical message interaction content and a historical message replying status, and wherein the first context data is used to represent user information or environment information when the user's historical message interaction information occurs;
a determining module configured to determine the user's message interaction preferences according to the user's historical message interaction information and the first context data that are obtained by the first obtaining module, wherein the message interaction preferences comprise a message reply policy and/or a message writing style;
a second obtaining module configured to:
receive a current message sent to the user; and
obtain second context data associated with the current message, wherein the second context data is used to represent user information or environment information when the user's current message occurs; and
a replying module configured to reply to the current message according to the message interaction preferences determined by the determining module and the current message and the second context data that are obtained by the second obtaining module, wherein the replying module comprises:
a first determining unit configured to determine, according to the message interaction preferences, a mapping rule between the user's historical message interaction status, historical message reception content included in the user's historical message interaction content, and the first context data;
a second determining unit configured to:
use, according to the mapping rule determined by the first determining unit, the current message and the second context data as an input of the mapping rule; and
determine a message reply policy of the current message; and
a replying unit configured to reply to the current message according to the message reply policy of the current message, wherein the policy is determined by the second determining unit.

13. The terminal according to claim 12, wherein the replying unit is configured to:
generate reply content when the message reply policy of the current message indicates replying to the current message; and
reply to the current message according to the message reply policy of the current message.

14. The terminal according to claim 12, wherein the replying unit is configured to:
generate reply content when the message reply policy of the current message indicates replying to the current message; and
reply to the current message according to the message reply policy and by using the message writing style included in the message interaction preferences.

15. The terminal according to claim 12, wherein the replying unit is configured to ignore the current message when the message reply policy of the current message indicates no replying to the current message.

* * * * *